C. Chavanne,
Bread Machine,
N° 58,596. Patented Oct. 9, 1866.
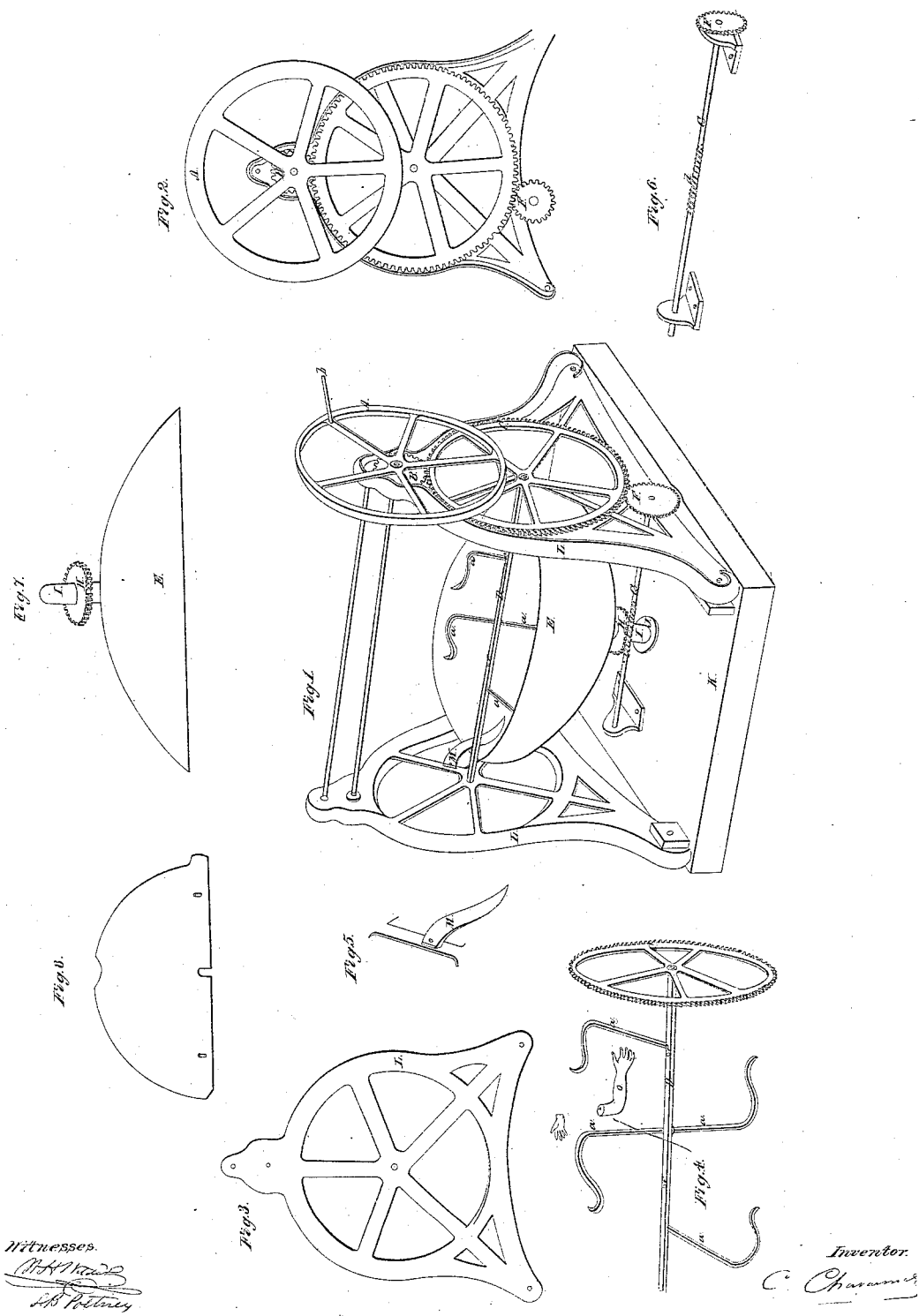
Witnesses.
Inventor.

UNITED STATES PATENT OFFICE.

CHARLES CHAVANNE, OF NEW ORLEANS, LOUISIANA.

IMPROVED DOUGH-MIXER.

Specification forming part of Letters Patent No. 58,596, dated October 9, 1866.

*To all whom it may concern:*

Be it known that I, CHARLES CHAVANNE, of the city of New Orleans, parish of Orleans, and State of Louisiana, have invented a new and useful Machine for the Mixing of Flour and Making into Dough or Paste, and the kneading the same to a proper consistency for the making of bread, biscuit, &c., or the mixing of paints, or any solids or liquids, or any material or substance susceptible of being amalgamated; and I do hereby declare that the following is a full, clear, and exact description of the construction and operation of the same, reference being had to the annexed drawings, making a part of this specification, in which—

Figure 1 is a perspective view. Fig. 2 is an end or side view, showing the fly-wheel A and handle $b$, spur-wheel B, pinion-wheel C, and spur-wheel F, with flanged frame L; Fig. No. 3, also a side or end view, showing the reverse or back of frame L and fixed arms. Fig. 4 shows pinion-wheel C as attached to shaft D, to which are attached the arms, with hands O as kneaders, or mixers $a\,a\,a$, and which are attached to shaft D by means of screws, bolts, and nuts, or otherwise, and can be detached at pleasure. Fig. 5 is the scraper M, attached to the arm of the frame L. Fig. 6 is the spur-wheel F, attached to shaft G, on which is cut an endless screw, $d$. Fig. 7 is the basin or bowl E reversed, showing thereby the cog-wheel H and the vertical shaft or column I that revolves in box J on platform K. The hands O are attached to represent the actual working of the arms and hands of a person in the act of kneading dough, and which, in like manner, is performed by this my machine.

By the construction and operation of the machine the fly-wheel A, on being set in motion by handle $b$, or any other power, turns spur-wheel B. This wheel B, acting on pinion-wheel C, causes that to revolve, which turns shaft D, to which is attached the arms, kneaders, or mixers $a\,a\,a\,a$, or by what other name I may designate them; pinion-wheel C also acting on spur-wheel F, which, in its turn, operates on shaft G, on which shaft G is cut the endless screw $d$. This endless screw $d$ operates or sets in motion spur or cog wheel H, which is attached to the vertical shaft or column I. Vertical shaft I is attached by bolts and rivets, or can be cast to bowl or basin E, and causes basin or bowl E to revolve or describe a circle over the plane or platform K. At the moment, therefore, that the machine is set in motion, at that instant the arms $a\,a\,a\,a$ and bowl E revolve, E on its axis I, and $a\,a\,a\,a$ on their axis D.

J is the box or countersink on platform K, within which the vertical shaft I turns. By means of these rotating actions the flour, meal, or other ingredients, on being placed in the bowl or basin E, and the machine set in motion, as described, the arm working over and over within the basin or bowl, and that revolving on its axis I, the dough or paste is mixed or kneaded.

On the side of the frame L, Fig. 3, is fastened a scraper, M. This scraper detaches the paste, dough, or other material from the sides of the basin as it revolves.

The plate N, Fig. 8, as shown, is used, after the completing of the kneading or mixing, in this wise: It is attached to the shaft D by pins or bolts in holes or sockets in the shaft D, and on its revolving it gathers the whole of the dough or paste into one mass, and thereby facilitates the removing of the same.

The hands O are screwed or placed in a socket on the arms $a\,a\,a\,a$, to represent and perform all the functions of the human arm and hand, as it would do while kneading or making dough or paste by manual labor.

What I claim as my invention, and desire to secure by Letters Patent, is—

The revolving of the bowl E and the arms $a\,a\,a\,a$ in the different directions at the same time, and the scraper M, as set forth and fully described.

C. CHAVANNE.

Witnesses:
W. H. WILDER,
L. B. POTTNEY.